(12) United States Patent
Latzina

(10) Patent No.: US 8,161,087 B2
(45) Date of Patent: Apr. 17, 2012

(54) DISPLAYING AND MANIPULATING VIRTUAL OBJECTS ON VIRTUAL SURFACES

(75) Inventor: Markus Latzina, Walldorf (DE)

(73) Assignee: SAP France, Levallois-Perret (FR)

( * ) Notice: Subject to any disclaimer, the term of this patent is extended or adjusted under 35 U.S.C. 154(b) by 550 days.

(21) Appl. No.: 12/346,383

(22) Filed: Dec. 30, 2008

(65) Prior Publication Data

US 2010/0169310 A1 Jul. 1, 2010

(51) Int. Cl.
*G06F 7/00* (2006.01)
(52) U.S. Cl. .................................. 707/831; 707/805
(58) Field of Classification Search ............... 707/821, 707/831
See application file for complete search history.

(56) References Cited

U.S. PATENT DOCUMENTS

| 7,397,464 B1 * | 7/2008 | Robbins et al. ............... 345/173 |
| 2003/0020707 A1 * | 1/2003 | Kangas et al. ................ 345/418 |
| 2008/0109796 A1 * | 5/2008 | Kosche ......................... 717/158 |

OTHER PUBLICATIONS

Baxley, Bob, "Universal model of a user interface", Designing For User Experiences, (2003), 1-14.
Feuerstack, Sebastian, et al., "Model-based Layout Generation", AVT'08, ACM 1-978-60558-141-5, (2008), 217-224.

* cited by examiner

Primary Examiner — Fazlul Quader
(74) Attorney, Agent, or Firm — Schwegman, Lundberg & Woessner, P.A.

(57) ABSTRACT

A computerized method of providing an interactive virtual surface to display virtual objects is described. The method may comprise providing the virtual surface via a graphical user interface on a display screen, wherein the virtual surface displays at least one axis and a plurality of virtual objects. The method may monitor positioning (including re-positioning) of each of the plurality of virtual objects by a user on the virtual surface relative to the axis. Thereafter, virtual object association data may be stored in a database identifying an association between each of the virtual objects and at least one attribute based on the positioning.

20 Claims, 13 Drawing Sheets

DISPLAYING AND MANIPULATING VIRTUAL OBJECTS ON VIRTUAL SURFACES

FIELD

The present disclosure relates generally to displaying and positioning virtual objects on one or more virtual surfaces. In an example embodiment, the disclosure relates to updating a database in response to a user positioning and/or re-positioning virtual objects on a virtual surface.

BRIEF DESCRIPTION OF DRAWINGS

The present disclosure is illustrated by way of example and not limitation in the figures of the accompanying drawings, in which like references indicate similar elements and in which.

DETAILED DESCRIPTION

The description that follows includes illustrative systems, methods, techniques, instruction sequences, and computing program products that embody the present invention. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures and techniques have not been shown in detail.

The embodiments described herein provide techniques for providing an interactive virtual surface to display and manipulate virtual objects (e.g., virtual objects associated with physical consumer products). One or more virtual surfaces are provided via a graphical user interface on a display screen, and positioning and/or repositioning of each of a plurality of virtual objects by a user on a virtual surface is monitored. Virtual object association data identifying an association between each of the virtual objects and at least one attribute (e.g., a subjective or objective characteristic of a consumer product) is stored in a database based on the positioning relative to an axis associated with the attribute. In an example embodiment, the virtual object association data is stored in addition to data used by a graphics-rendering engine to render the object on the display screen. The virtual object association data may leverage the two dimensional qualities of two-dimensional surfaces and spatial positioning therein.

Figure 1:
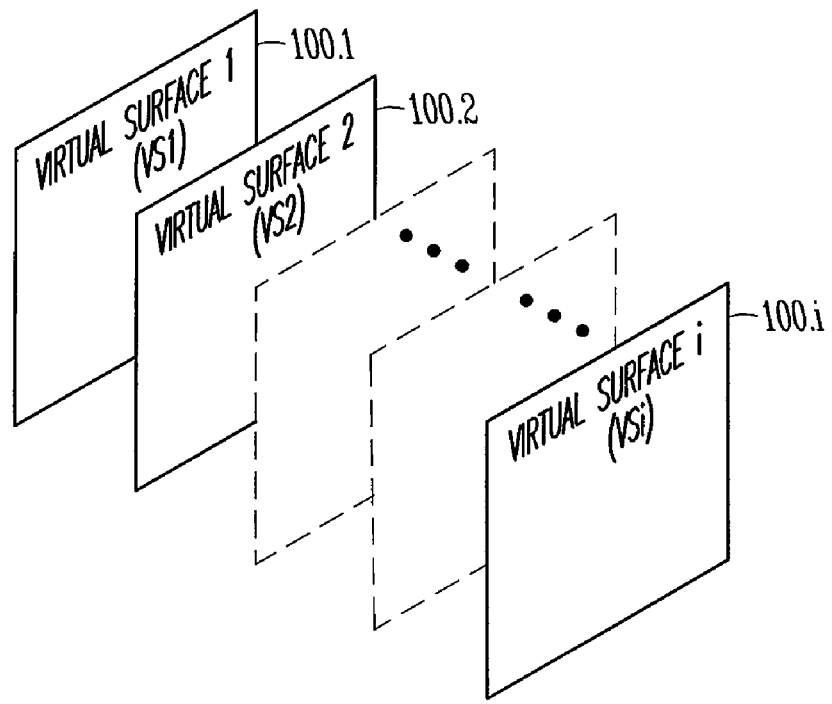
FIG. 1 shows a schematic representation of a plurality of virtual surfaces and a corresponding database, in accordance with an example embodiment, for displaying virtual objects and storing virtual object association data.
Figure 1:
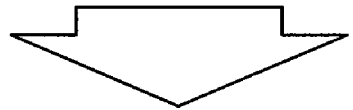
Figure 1:
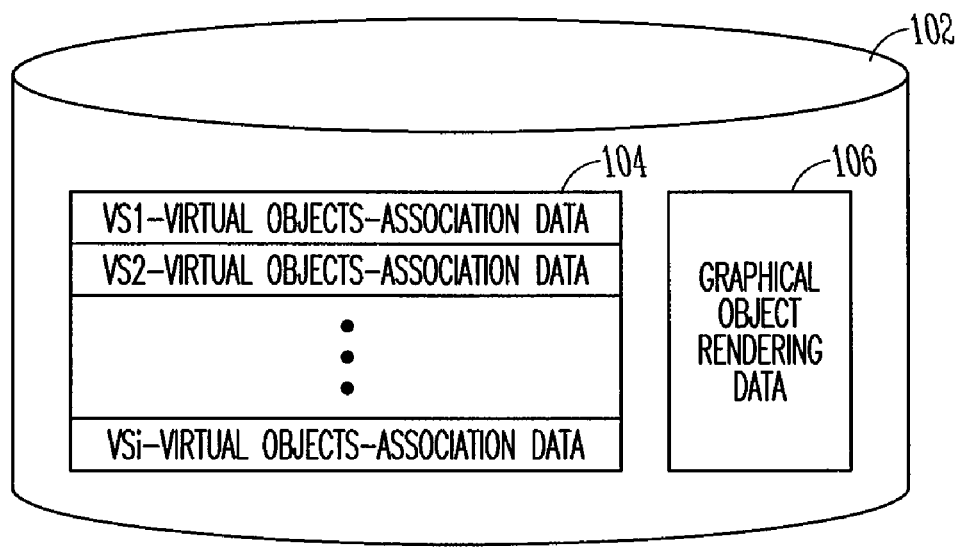

FIG. 1 shows a schematic representation of a plurality of virtual surfaces 100.1-100.i and a corresponding database 102, in accordance with an example embodiment, for displaying virtual objects and storing virtual object association data.

As described in more detail below, each virtual surface 100.1-100.i may optionally be associated with a user and display one or more virtual objects that the user can manipulate, for example, relative to an axis. In response to the positioning (and/or repositioning) of a virtual object, the virtual object association data identifying an association between the virtual object and at least one attribute may be stored in the database 102.

The database 102 is shown to include independent storage arrangements (at least functionally) for virtual object association data and graphical object rendering data. For example, a virtual object storage arrangement 104 may be provided to store virtual objects and virtual object association data associated with each of the virtual surfaces 100.1-100.i. Independently of the virtual object storage arrangement 104, a graphical object storage arrangement 106 is provided to store graphical object rendering data that is used by a graphics-rendering engine to render the virtual objects on the virtual surface as 100.1-100.i. In an example embodiment, in contrast to the virtual object storage arrangement 104, the graphical object storage arrangement 106 may include a Flat File providing coordinates at which to position a virtual object on a display screen. Thus, in an example embodiment, the graphical object rendering data may be "dumb" data used to render a virtual object on a display screen whereas, the virtual object association data may be "rich" data that has utility and meaning based on the positioning of the virtual object relative to an axis with an associated virtual object attribute.

Figure 2:
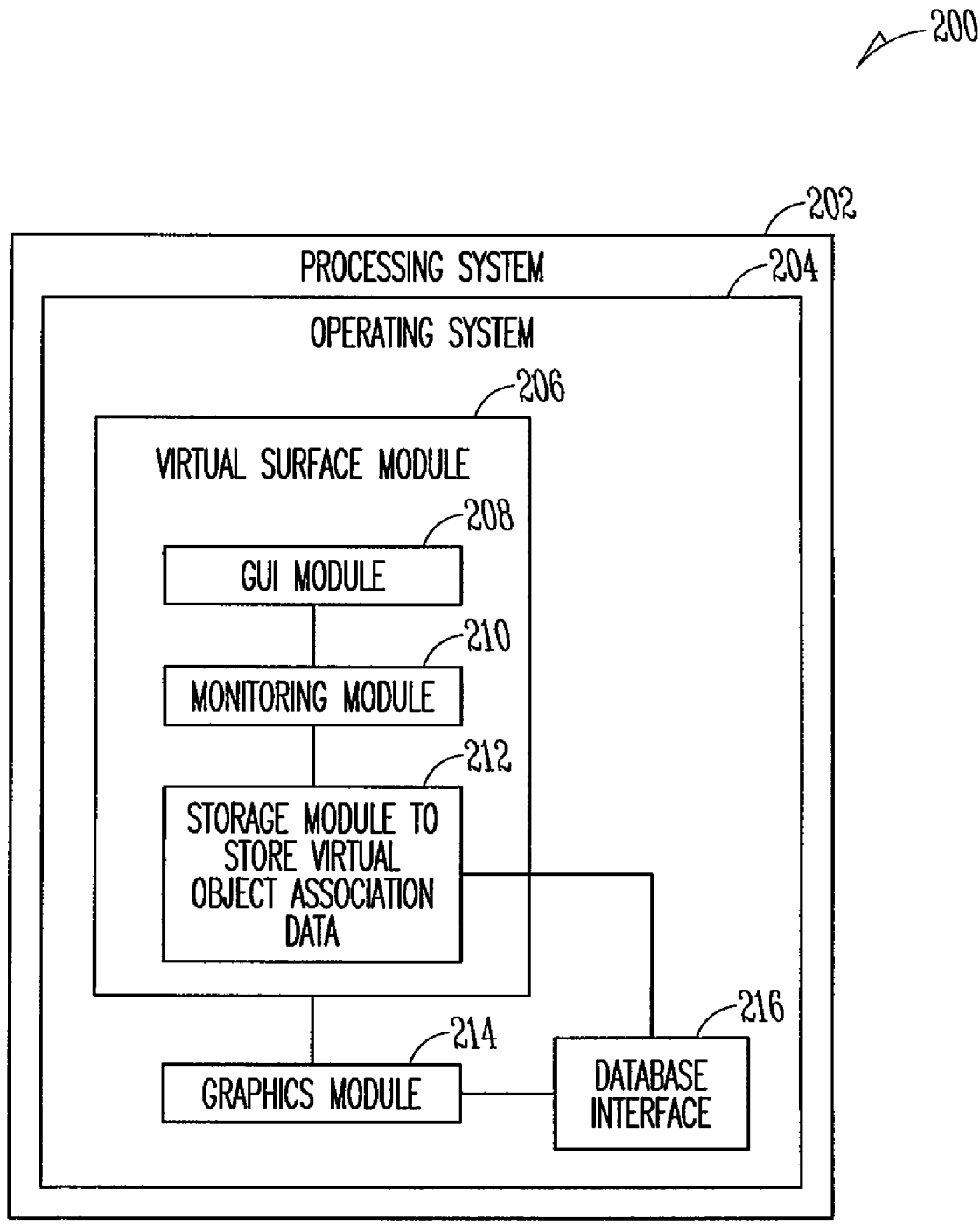
FIG. 2 shows a schematic representation of an apparatus, in accordance with an example embodiment, to display virtual objects on virtual surfaces and produce virtual object association data in a corresponding database.

FIG. 2 shows a schematic representation of an apparatus 200, in accordance with an example embodiment, to display virtual objects on virtual surfaces and produce virtual object association data in a corresponding database. For example, the apparatus 200 may be used to implement the virtual surfaces 100.1-100.i and the database 102 (see FIG. 1) and, accordingly, is described by way of example with reference thereto.

The apparatus 200 is shown to include a processing system 202 that may be implemented on a server, client, or other processing device that includes an operating system 204 for executing software instructions. In accordance with an example embodiment, the apparatus 200 includes a virtual surface module 206 to display virtual objects on virtual surfaces (e.g. the virtual surfaces 100.1-100.i) and to produce virtual object association data stored in a corresponding database (e.g. database 102). The virtual surface module 206 is shown to include a graphical user interface (GUI) module 208, a monitoring module 210, a storage module 212 to store virtual object association data, a graphics module 214 to render virtual objects on a display screen, and a database interface 216. The database 102 may be stored locally and/or remotely in a data storage network.

In an example embodiment, the database interface 216 may provide database management functionality including a database application, a database management system (DBMS), one or more databases (local and/or remote), input/output (I/O) buffer caches, and the like. The database application may provide order fulfillment, business monitoring, inventory control, online shopping, and/or any other suitable functions by way of interactions with other elements of the processing system 202. According to some example embodiments, the database application communicates with the DBMS over one or more interfaces provided by the DBMS. The database application may, in turn, support client applications executed by client devices.

The DBMS may comprise any suitable system for managing a database instance. Generally, the DBMS may receive requests for data (e.g., Structured Query Language (SQL) requests from the database application), may retrieve requested data from the database 102, and may return the requested data to a requester. The DBMS may also perform start-up, logging, recovery, management, optimization, monitoring, and other database-related tasks.

It should be appreciated that the database 102 is an example of a storage arrangement or data structure. The "data structure" provides context for the organization of data. Examples of data structures include tables, arrays, linked lists, indexes, databases, and other data structures. In particular, a "database" refers to one or more structured sets of persistent data.

An example of the database 102 is a single file containing many records, with each record containing the same set of fields where each field has a certain fixed length. In the example of FIG. 1, the database 102 may comprise one or more disparate systems for storing data, and therefore the DBMS may comprise one or more systems for retrieving the stored data.

Figure 3A:
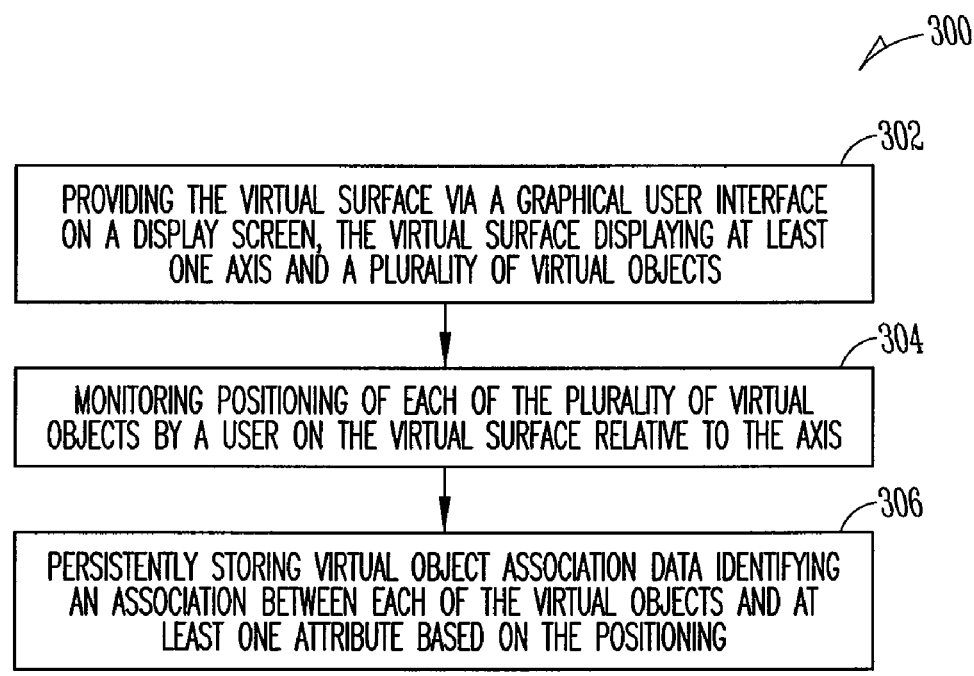
FIG. 3A shows a schematic representation of a method, in accordance with an example embodiment, for displaying virtual objects on virtual surfaces and producing virtual object association data.

FIG. 3A shows a schematic representation of a method 300, in accordance with an example embodiment, for displaying virtual objects on virtual surfaces and producing virtual object association data. The method 300 may be performed by the apparatus 200 and, accordingly, is described by way of example with reference thereto. Further, the method 300 may display virtual objects on the virtual surfaces 100.1-100.i and operate in conjunction with the database 102 (see FIG. 1).

As shown at block 302, the method 300 includes providing a virtual surface (e.g. a virtual surfaces 100.1-100.i) via a graphical user interface (e.g., using the GUI module 208) on a display screen. Further, the virtual surface 100.1-100.i may display at least one axis and a plurality of virtual objects as described in more detail below. In an example embodiment, the virtual objects may correspond to physical objects such as consumer products, evaluated, for example, by one or more users based on one or more attributes. It is to be noted that virtual objects may also correspond to people or users on components of a system. The attributes may be objective and/or subjective attributes. For example, as described in more detail below, the consumer product object may be new and the attributes may be various design considerations such as speed, comfort, styling and so on. A virtual object may visually represent the new car to a user and the association data may identify the user's evaluation, view, or perception of the new car. It should however be noted that the example embodiments are not limited to evaluation of consumer products but may be used to obtain user input (subjective and/or objective) on any subject (e.g., news reviews, manufacturing processes, procedures, proposed designs etc.)

Returning to FIG. 3A, as shown at block 304, the method 300 may then monitor positioning of each of the plurality of virtual objects by the user on the virtual surface 100.1-100.i relative to the axis (e.g. a horizontal axis). Thereafter, as shown at block 306, the method 300 may persistently store virtual object association data identifying an association between each of the virtual objects and the at least one attribute based on the positioning. For example, the virtual object association data may be stored in the virtual object storage arrangement 104.

Figure 4:
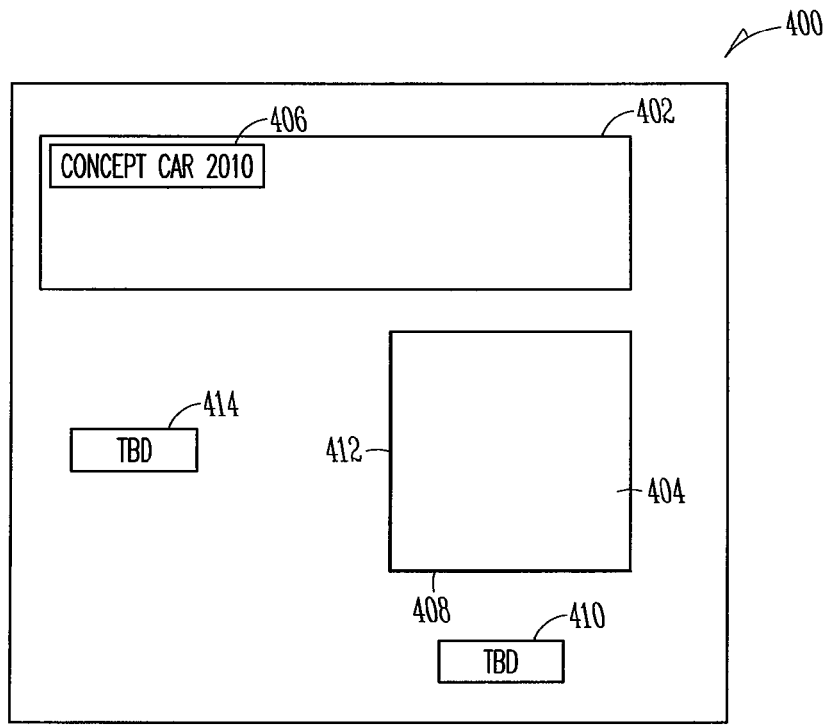
FIG. 4 shows a schematic representation of a graphical user interface, in accordance with an example embodiment, including an inactive virtual surface and an active virtual surface for positioning virtual objects relative to one or more axes.

FIG. 4 shows a schematic representation of a graphical user interface (GUI) 400, in accordance with an example embodiment, including an inactive virtual surface 402 and an active virtual surface 404. The GUI 400 may be used when executing the method 300 and, accordingly, is described by way of example with reference thereto.

For example, a user may be required to evaluate a concept car with respect to one or more attributes. These attributes may be predefined, user defined, or subsequently determined. The method 300 may then provide the graphical user interface 400 including the inactive virtual surface 402 and the active virtual surface 404. In an example embodiment, the inactive virtual surface 402 may provide a display area or holding area in which the relative positioning of the virtual objects is not relevant. However, in the active virtual surface 404 the positioning of the virtual objects is relevant and provides virtual object association data. In the example GUI 400 the inactive virtual surface 402 provides a holding area for a virtual object 406 representing a concept car 2010 for evaluation by a user. The active virtual surface 404 is shown by way of example to include a horizontal axis 408 with an associated attribute 410 and a vertical axis 412 with an associated attribute of 414. In the example GUI 400 the attributes 410, 414 are still to be determined (TBD). In use, the method 300 may then monitor positioning of the virtual object 406 by the user on the active virtual surface 404 relative to the horizontal axis 408 and/or the vertical axis 412. As shown at block 306, the method 300 may then store first association data identifying the position of the virtual object 406 relative to the horizontal axis 408 and store second association data identifying the position of the virtual object 406 relative to the vertical axis 412 as described in more detail by way of example below. Thus, in an example embodiment, the method 300 and the GUI 400 may be used to allow one or more users to evaluate ideas, information, physical characteristics or the like, represented by virtual objects, and store virtual object association data in a database for subsequent processing or use.

Figure 5:
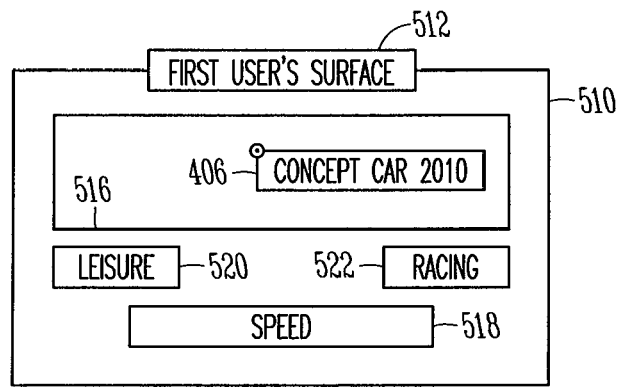
FIG. 5 shows a schematic representation of an individual virtual surface, in accordance with an example embodiment, associated with a first user and including the example virtual object of FIG. 4 positioned relative to a horizontal axis based on a first attribute.

FIG. 5 shows a schematic representation of an individual virtual surface 510, in accordance with an example embodiment, associated with a first user 512. The individual virtual surface 510 is shown to include the example virtual object 406 of FIG. 4 positioned relative to a horizontal axis 516 based on a first attribute. The first attribute is shown by way of example to be a speed attribute 518.

The speed attribute 518 is shown by way of example to include two sub-attributes associated therewith, namely, a leisure sub-attribute 520 and a racing sub-attribute 522. In use, the first user 512 may then position the virtual object 504 (e.g., representing the concept car) relative to the horizontal axis 516 based on his or her speed preferences. Accordingly, if the user positions the virtual object 406 proximate to the racing sub-attribute 522, it may be deduced that the first user considers speed to be a favorable characteristic of the concept car. However, if the user positions the virtual object 406 proximate to the leisure sub-attribute 520, it may be deduced that the first user 512 considers speed of the concept car to be of less importance. In the example FIG. 5, the virtual object 406 is shown to be positioned midway between the leisure sub-attribute 520 and the racing sub-attribute 522. Accordingly, it may be deduced that the first user 512 is neutral in his or her preference for speed in the concept car. In the example individual virtual surface 510, it will be noted that the poles of the horizontal axis 516 correspond to extremes of leisure and racing and the continuity between these poles may be inferred by users through semantic analysis.

Figure 6:
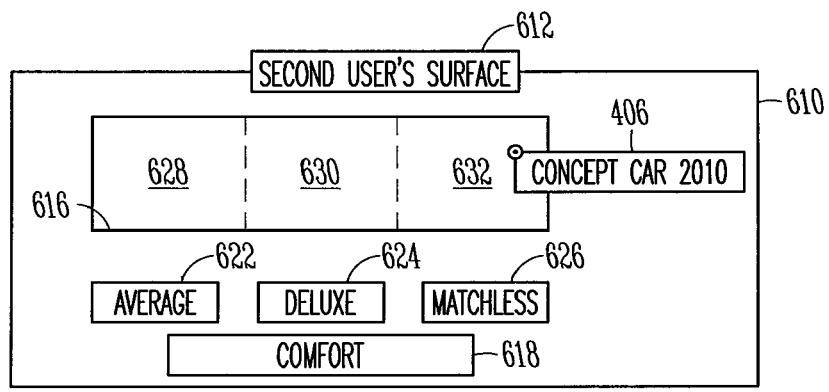
FIG. 6 shows a schematic representation of an individual virtual surface, in accordance with an example embodiment, associated with a second user and including the example virtual object of FIG. 4 positioned relative to the horizontal axis based on a second attribute.

FIG. 6 shows a schematic representation of an individual virtual surface 610, in accordance with an example embodiment, associated with a second user 612 and including the example virtual object 406 of FIG. 4 positioned relative to the horizontal axis 616 based on a second attribute. The second attribute is shown by way of example to be a comfort attribute 618. Further, the comfort attribute 618 is shown by way of example to include three sub-attributes, namely, an average sub-attribute 622, a deluxe sub-attribute 624, and a matchless sub-attribute 626.

The virtual surface 610 may substantially resemble the virtual surface 510. However, in contrast to the horizontal axis 516, the horizontal axis 616 includes three discrete zones in which the virtual object 406 may be positioned. The relative positioning along the horizontal axis 616 within any particular zone may not change the virtual object association data stored in the database 102. In particular, the average sub-attribute 622 is associated with a virtual surface zone 628, the deluxe sub-attribute 624 is associated with a virtual surface zone 630, and the matchless sub-attribute 626 is associated with a virtual surface zone 632. Virtual object association data for each virtual object placed in a particular virtual surface zone 628, 630 or 632 is the same irrespective of the positioning of the virtual object 406 within the particular zone 628, 630 or 632. In the example virtual surface 610, the second user 612 is shown to have positioned the virtual object 406 in the virtual surface zone 632 corresponding to the matchless sub-attribute 626 thereby identifying that he or she considers the comfort of the concept car to be neither average nor deluxe.

Thus, in an example embodiment, one or more virtual objects may be positioned by a plurality of different users wherein each user has an associated individual virtual surface on which he or she has positioned the virtual object based on at least one attribute. In an example embodiment, various properties of the virtual surfaces and the virtual objects can be enabled to provide various user experiences. Each virtual surface may provide a multi-purpose user interface element that facilitates human-computer-interaction on a continuum between the poles of continuous vs. discrete representations, and intuitive vs. analytic interaction modes. Example embodiments allow users to manipulate virtual objects which can be flexibly furnished with attributes or attribute values at various degrees of rigidity, e.g., pertaining to structure, completeness /detail, or determination. Such users may be knowledge workers, for example, information workers/business users.

Figure 3B:
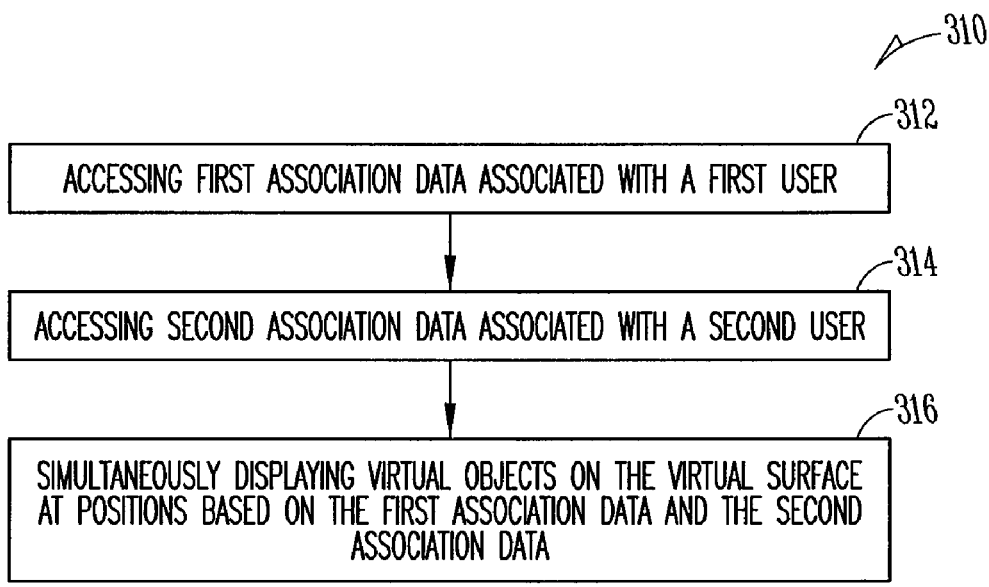
FIG. 3B shows a schematic representation of a method, in accordance with an example embodiment, for simultaneously displaying virtual objects on a virtual surface based on virtual object association data corresponding to different individual virtual surfaces.

FIG. 3B shows a schematic representation of a method 310, in accordance with an example embodiment, for simultaneously displaying virtual objects on a virtual surface based on virtual object association data corresponding to different individual virtual surfaces. The individual virtual surfaces may or may not correspond to different users. Further, the method 310 may used in conjunction with the GUI 400 and the virtual surfaces 510 and 610 and, accordingly, is described by way of example with reference thereto.

Figure 7:
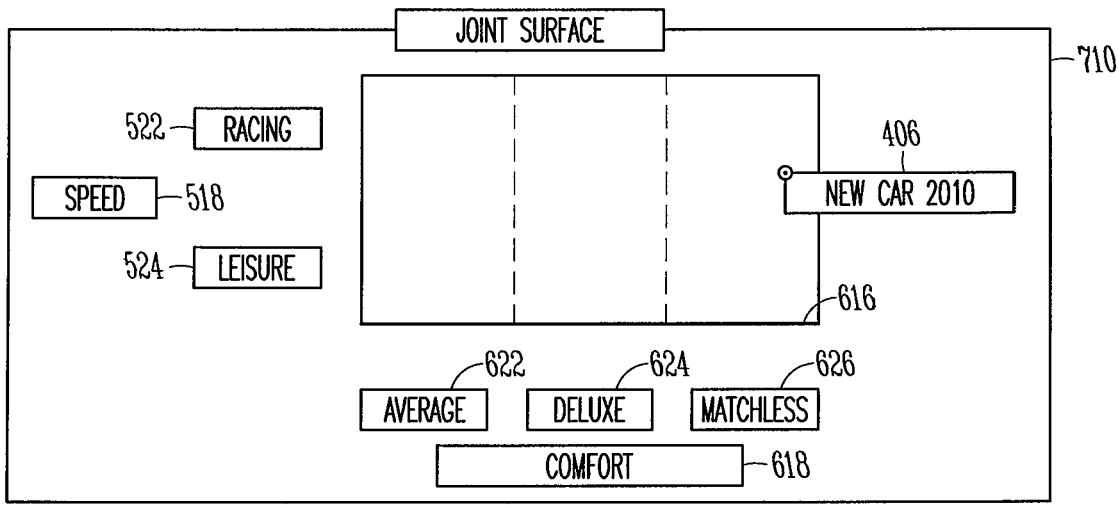
FIG. 7 shows a schematic representation of a joint virtual surface, in accordance with an example embodiment, for simultaneously displaying the individual virtual surfaces of the first and second users.

The method 310 may, for example, be used to simultaneously display the positioning of the virtual object 406 as positioned by both the first user 512 and the second user 612. Accordingly, as shown at block 312, the method 310 may include accessing first association data associated with the first user 512. The first association data may, for example, correspond to the first user's evaluation of subject matter represented by the virtual object 406. Thus, the first association data may identify the position of the virtual object 406 relative to the horizontal axis 516. Thereafter, as shown at block 314, the method 310 may then access second association data associated with the second user 612. The second association data may identify the relative position of the virtual object 406 relative to the horizontal axis 616. Thereafter, as shown at block 316, the method 310 may simultaneously display the virtual object on the virtual surface at positions based on the first association data and the second association data. FIG. 7 shows an example of such a display. The first and second users are an example of a plurality of users.

FIG. 7 shows a schematic representation of a joint virtual surface 710, in accordance with an example embodiment, simultaneously displaying the individual virtual surfaces of the first and second users 512 and 612. In the example virtual surfaces 510 and 610, the associations determined by the positions of the example virtual object 406 relative to an associated axis by the first and second users 512, 612 are integrated into one single joint surface 710 preserving the various degrees of determination (e.g., specificity) of each individual virtual surface 510, 610. The virtual object 406 (e.g., representing the concept car) is positioned by way of example with respect to the speed attribute 518 on an implicit bi-polar continuum, ranging between extremes of sub-attributes leisure and racing. However the virtual object 406 is positioned unequivocally with respect to the comfort attribute 618 in a virtual surface zone corresponding to the matchless sub-attribute 626. The positioning (corresponding to the user evaluation) of the virtual object 406 is relative to the leisure sub-attribute 520 and the racing sub-attribute 522. In contrast, the positioning of the virtual object 406 is discrete with respect to the sub-attributes 622, 624, and 626.

As described in more detail below, the position of one virtual object relative to another may be identified from the virtual object association data. The relative positioning can contain ordinal information, e.g. Object A>Object B>Object C, without revealing exact values or how large the intervals between values of various virtual objects are. Virtual objects may be defined with various degrees of precision and mixing of heterogeneous attribute dimensions (e.g., continuous vs. discrete). In example embodiments, virtual objects may be defined based on implicit measurement by relative positioning of the virtual objects with respect to each other. For example, virtual objects can be arranged along a continuous scale, ranging from "very little" to "very much", without any of the positioned virtual objects receiving any numerical or ordinal value. Thus, the relation between two Objects A and B can be inferred, e.g., by stating that Object A scores higher on the same attribute than Object B or C.

Figure 3C:
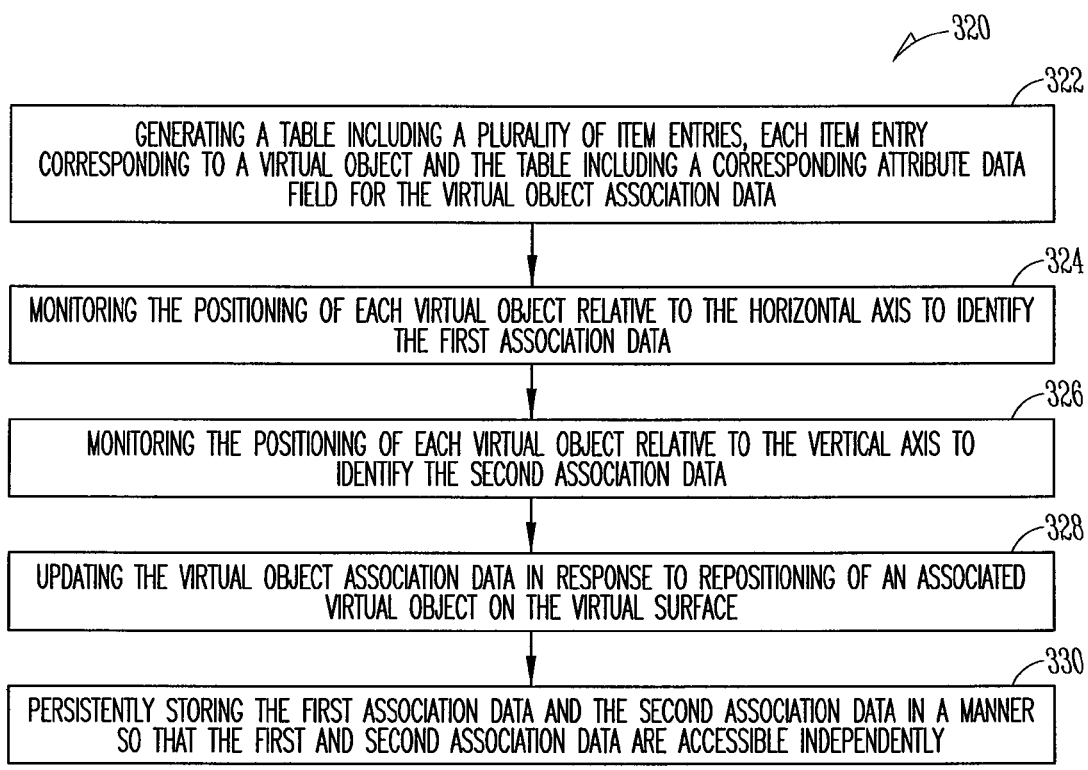
FIG. 3C shows a schematic representation of a method, in accordance with an example embodiment, for persistently storing association data in a manner so that a plurality of association data are accessible independently.

FIG. 3C shows a schematic representation of a method 320, in accordance with an example embodiment, for persistently storing first association data and second association data in a manner so that the first and second association data are accessible independently. The first and second association data is stored in addition to graphical object data used by a graphics-engine to render the virtual objects on the virtual surface (e.g., the virtual surfaces 100.1-100.i).

Figure 8:
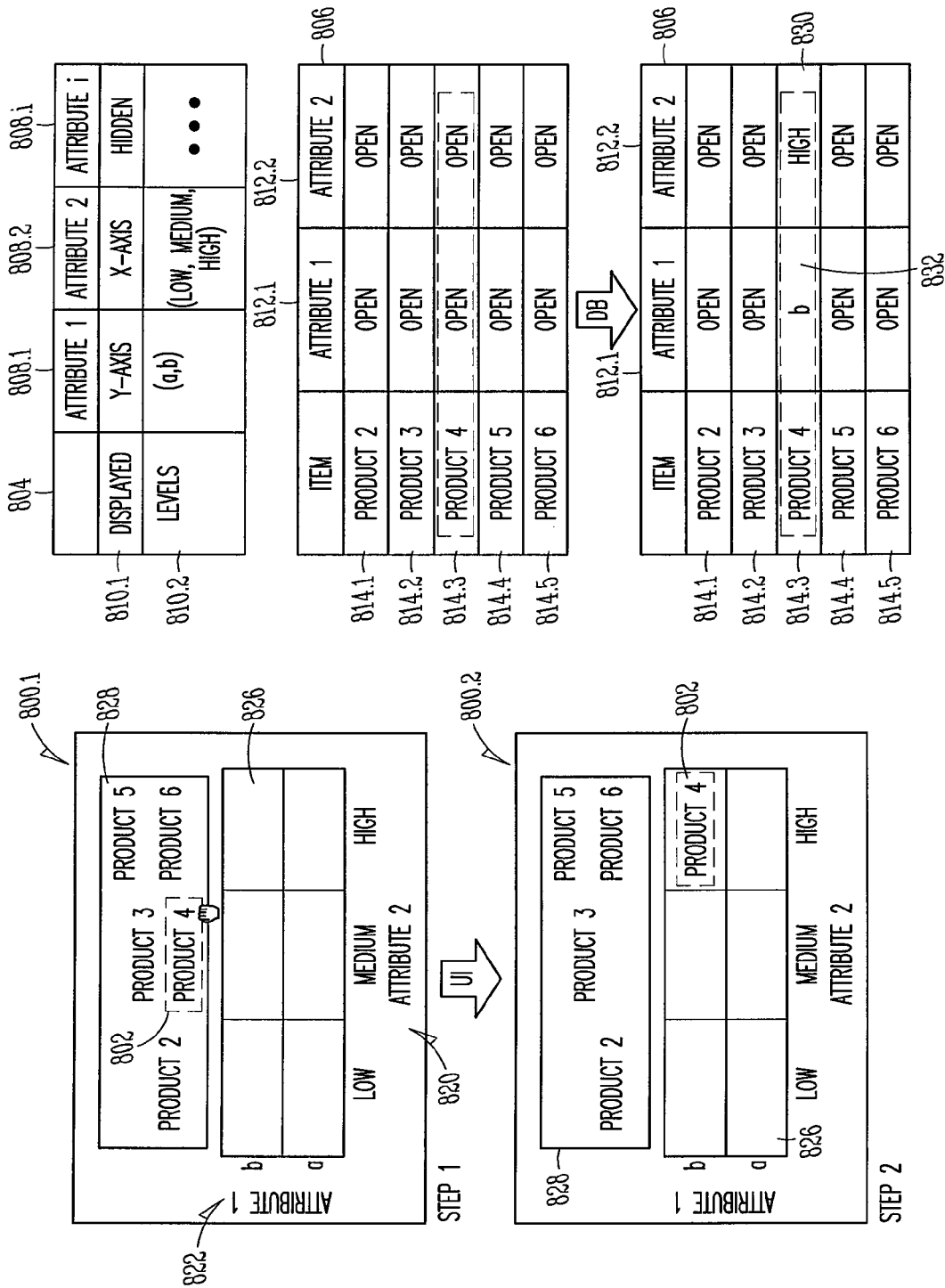
FIG. 8 shows a functional representation of updates to a database, in accordance with an example embodiment, in response to a user positioning a virtual object on a virtual surface using a pointing device where the database includes no initial virtual object association data.
Figure 9:
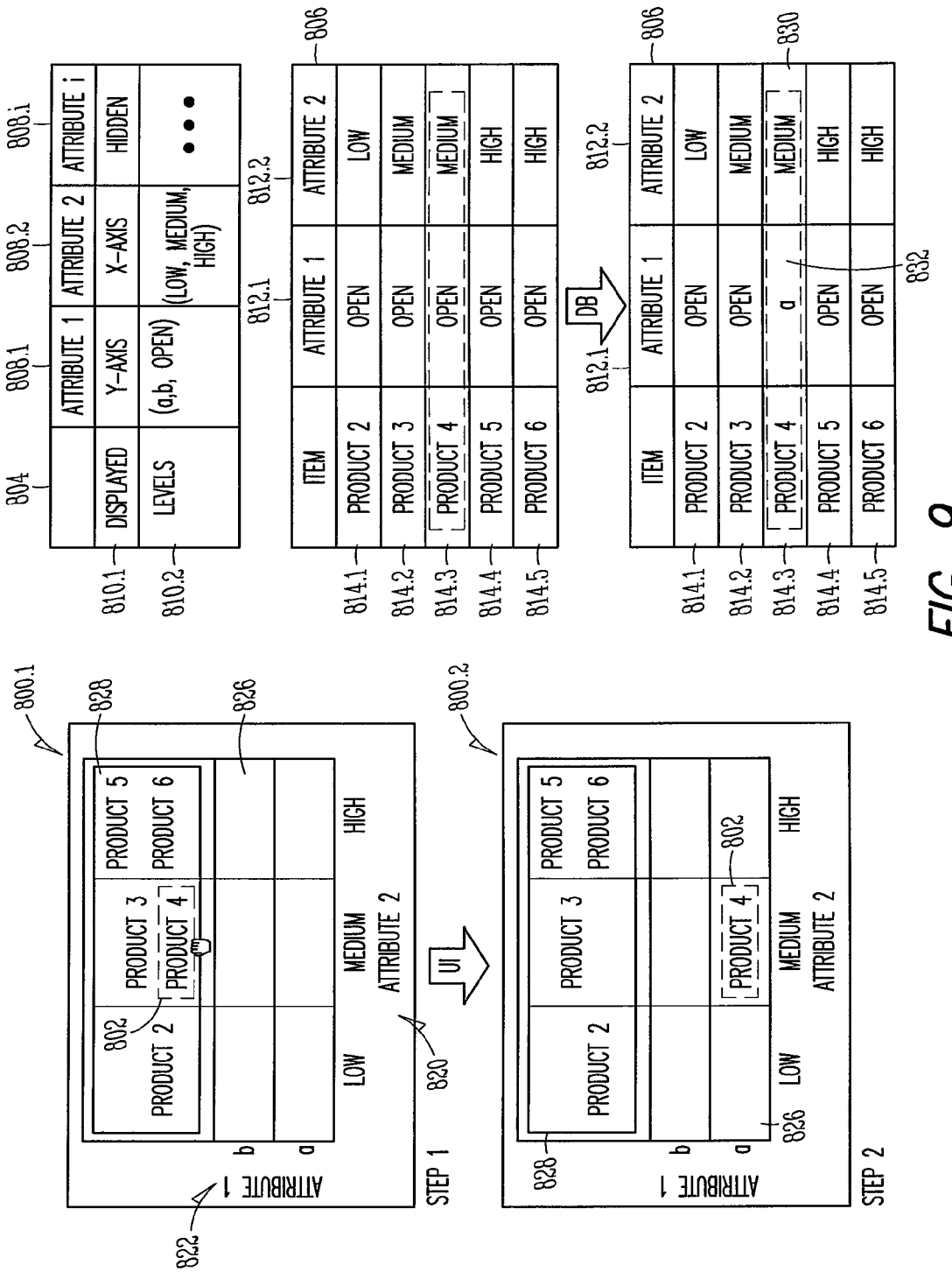
FIG. 9 shows a functional representation of updates to the database, in accordance with an example embodiment, in response to a user positioning a virtual object on a virtual surface using a pointing device where the database includes initial association data.
Figure 10:
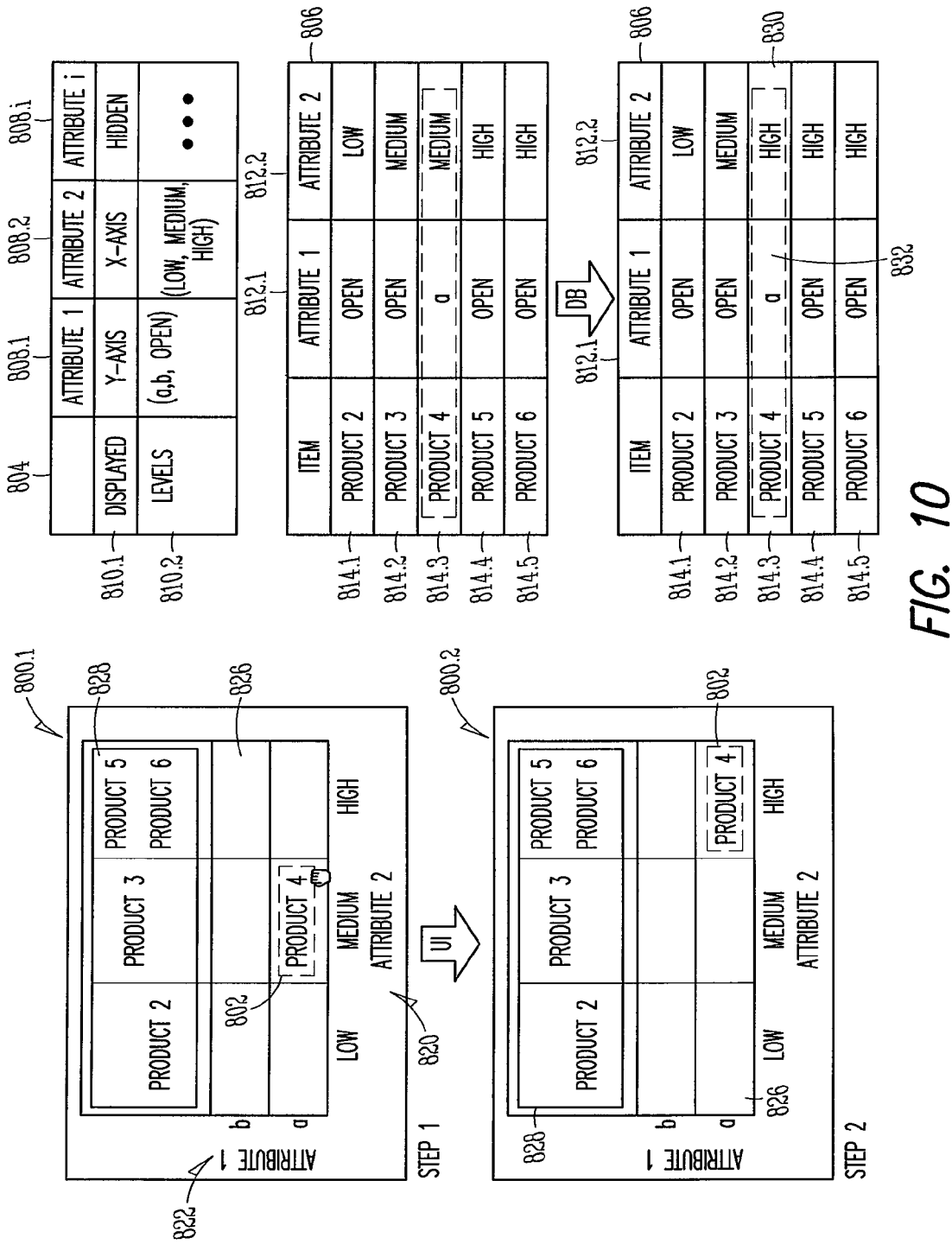
FIG. 10 shows a functional representation of updates to the database, in accordance with an example embodiment, in response to a user repositioning a virtual object on a virtual surface using a pointing device.

The method 320 may persistently store data in a database including a plurality of tables as shown, by way of example, in FIGS. 8-10. Accordingly, the method 320 is described by way of example with reference to FIGS. 8-10. FIG. 8 shows a functional representation of updates to the example database 102 in response to a user positioning a virtual object 802 on an active virtual surface 826 using a pointing device (e.g., a computer mouse) where the database 102 includes no initial virtual object association data.

Returning to FIG. 3C, as shown at block 322 the method 320 includes generating a table including a plurality of item entries wherein each item entry corresponds to a virtual object. The table may further include a corresponding attribute data field for the virtual object association data. In an example embodiment, a table 804 is generated that identifies a plurality of attributes, and axis associated with each attribute, and a level of granularity of association data corresponding to each axis.

Accordingly, the table 804 is shown, by way of example, to include a column 808.1 associated with a first attribute, a column 808.2 associated with a second attribute, and a column 808.i associated with an $i^{th}$ attribute. A row 810.1 identifies an axis associated with each attribute, and a row 810.2 identifies the granularity or continuity of graduations along a corresponding axis. For example, "attribute 2" is displayed on an x-axis and is shown to include sub-attributes low, medium, and high (see arrow 820). "Attribute 1" is displayed on the y-axis and is shown to include sub-attributes "a" and "b" (see arrow 822).

In an example embodiment, an association data table 806 is provided to store association data corresponding to each virtual object. In the example table 806 the virtual objects correspond to products. The virtual object association data table 806 includes a column 812.1 corresponding to a first attribute ("Attribute 1") and a column 812.2 corresponding to a second attribute ("Attribute 2"). Rows 814.1-814.5 correspond to virtual objects which, in the example association data table 806, correspond to products. Fields in the association data table 806 are provided to store association data corresponding to the positioning by a user of virtual objects (e.g. products) on an active virtual surface 826. In the example embodiment, the GUI 800.1 is shown to include an inactive virtual surface 828 that serves as a display area for the various products identified in the virtual object association data table 806. It will be noted in the GUI 828 all the products are still located on the inactive virtual surface 828 awaiting evaluation by a user and, accordingly, fields in the virtual object association data table 806 are shown as open.

Returning to FIG. 3C, as shown at block 324 the method 320 may monitor the positioning of each virtual object 802 relative to the horizontal or x-axis to identify the first association data. For example, as shown in GUI 800.2, a user may drag or drop, cut or paste or otherwise move the virtual object 802 from the inactive virtual surface 828 to a selected location in the active virtual surface 826 (see step 1 and step 2 in FIG. 8). In response to the user positioning the virtual object 802 on the active virtual surface 802, the virtual object association data table 806 is updated to reflect the position of the virtual object 802 relative to an axis. In the example embodiment, the x-axis is shown to be associated with attribute 2 (see table 804) and attribute 2 is shown to include sub-attributes low, medium and high. In the example shown in FIG. 8, the virtual object 802 is shown to be moved by the user into a virtual surface zone associated with the sub-attribute high. Accordingly, the virtual object association data table 806 is updated so that a corresponding field 830 includes virtual object association data "high". Thus, it will be appreciated that positioning of the virtual object 802 relative to the x-axis results in an updating of the virtual object association data table 806.

The method 320 further includes monitoring the positioning of each virtual object 802 relative to the vertical or y-axis to identify second association data as shown in block 326. For example, in the GUI 800.2 the virtual object 802 is shown to be positioned in a virtual surface zone corresponding to the sub-attribute "b" associated with the y-axis (see table 804). Accordingly a field 832 of the virtual object association data table 806 is updated so that the virtual object association data corresponds to the positioning of the virtual object 802 relative to the y-axis. Thus, in an example embodiment, the method 320 includes updating the virtual object association data in response to positioning a virtual object on a virtual surface (see block 328). The first association data and the second association data may be persistently stored in a manner so that the first and second association data are accessible independently (see block 330). For example, as can be seen in the virtual object association data table 806, the relative location and thus user evaluation is available for processing independently of any graphical rendering co-ordinate data user by a graphics engine to display graphical objects on a display screen.

FIG. 9 shows a functional representation of updates to the database 102 in response to a user positioning the virtual object 802 on the active virtual surface 826 using the pointing device where the database 102 includes initial virtual object association data. In this example embodiment, another user may already have evaluated the products 814.1-814.5 as low, medium, medium, high, and high respectively based on attribute 2. The association data for attribute 1 is shown to be open and requiring evaluation. The GUI 800.2 shows, by way of example, product 4 positioned by a user on a virtual surface zone corresponding to the sub-attribute "a". Accordingly, the table 806 is updated to reflect the user's evaluation. Thus a change on the virtual surface of the GUI 800 evokes change in backend data storage (e.g., virtual object association data table 806).

FIG. 10 shows a functional representation of updates to the database 102 in response to the user repositioning the virtual object 802 on the active virtual surface 824 using the pointing device. In FIG. 10 product 4 is shown re-positioned with respect to Attribute 2 and, accordingly, the virtual object association data table is updated to reflect the new association (medium to high).

Figure 12:
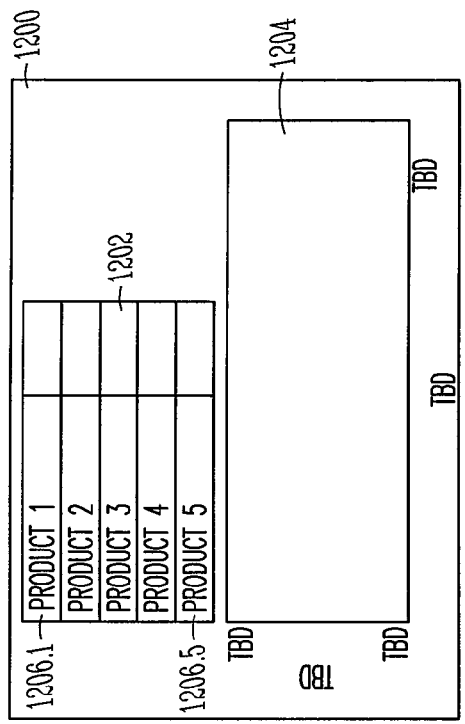
FIGS. 11-13 show example graphical user interfaces, in accordance with example embodiments, for providing virtual objects to the user to allow positioning of each object on the virtual surface relative to an axis.
Figure 11:
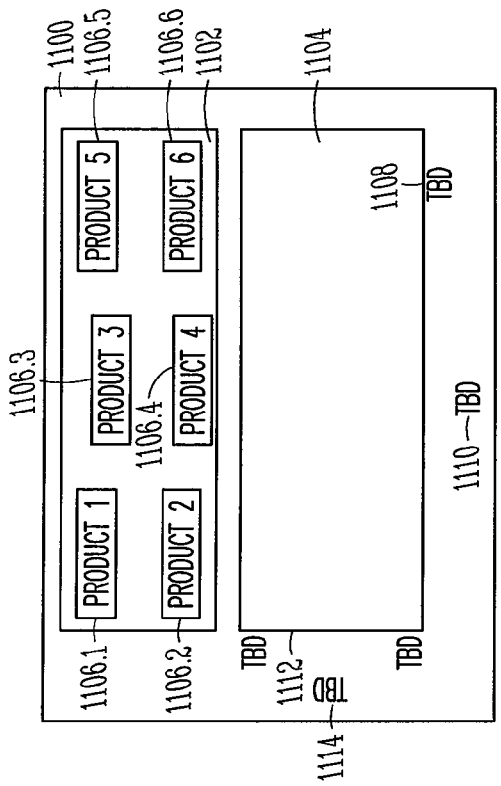
Figure 13:
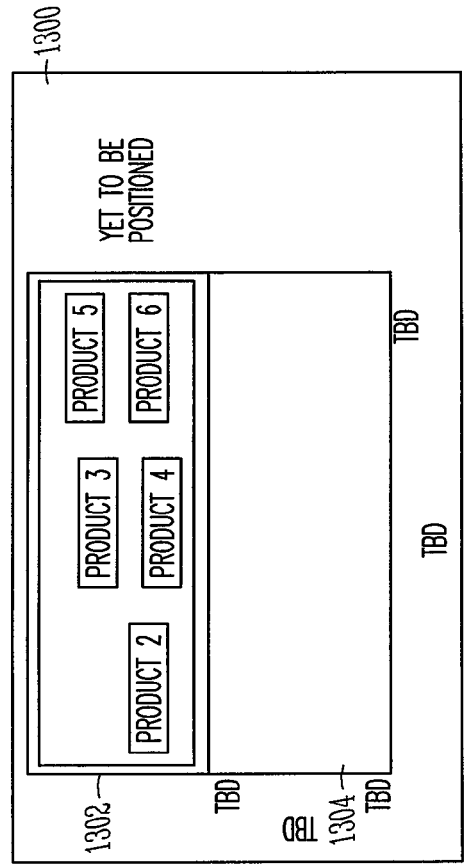

FIGS. 11-13 show example graphical user interfaces, in accordance with example embodiments, for providing the virtual objects to the user to allow positioning of each virtual object on an active virtual surface relative to an axis.

In FIG. 11, a GUI 1100 is shown to include an inactive virtual surface 1102 and active virtual surface 1104. Six virtual objects 1106.1-1106.6 are, by example, provided on the inactive virtual surface 1102. The active virtual surface 1104 is shown to include a horizontal axis 1108 with an associated virtual object attribute 1110, and a vertical axis 1112 with an associated virtual object attribute 1114. In the example GUI 1100, the inactive virtual surface 1102 and the active virtual surface 1104 are shown to be separate surfaces. Further, merely by way of example, the virtual objects 1106.1-1106.6 are shown to be unlabeled and a user may label the virtual objects based on a specific evaluation task at hand. For example, the virtual objects 1106.1-1106.6 may be associated with various motorcars and, accordingly, Product 1 1106.1 may represent a Porsche, Product 2 1106.2 may represent a BMW, and so on. Dependent upon the manner in which the products are to be assessed or evaluated, a user may then define the virtual object attributes 1110 and 1114 accordingly. For example, the virtual object attribute 1110 may relate to speed whereas the virtual object attribute 1114 may relate to comfort (see for example FIGS. 5 and 6).

In FIG. 12, a GUI 1200 is shown to include an inactive virtual surface area 1202 where virtual objects are arranged in a table 1202. The GUI 1200 is also shown to include an active virtual surface area 1204 that is substantially similar to the active virtual surface area 1104. As in the case of the GUI 1100, in the GUI 1200 a user may drag and drop or cut and paste virtual objects 1206.1-1206.5 onto the active virtual surface 1204. In response to positioning the virtual objects 1206.1-1206.5 on the active virtual surface 1204, a database (e.g., see the virtual object association data table 806) is updated with virtual object association data.

In FIG. 13, a GUI 1300 is also shown to include an inactive virtual surface 1302 and an active virtual surface 1304. The active virtual surface 1304 may substantially resemble the active virtual surfaces 1104 and 1204. In the GUI 1300, the inactive virtual surface 1302 and the active virtual surface 1304 are not detached as in the case of the GUI 1100.

The GUIs 1100, 1200 and 1300 merely show examples of virtual surfaces and should not be construed as limiting in any way. It will be appreciated that various other configurations may be provided in which virtual objects are presented to a user for positioning on an active virtual surface area resulting in updating of virtual object association data in a database.

Figure 14:
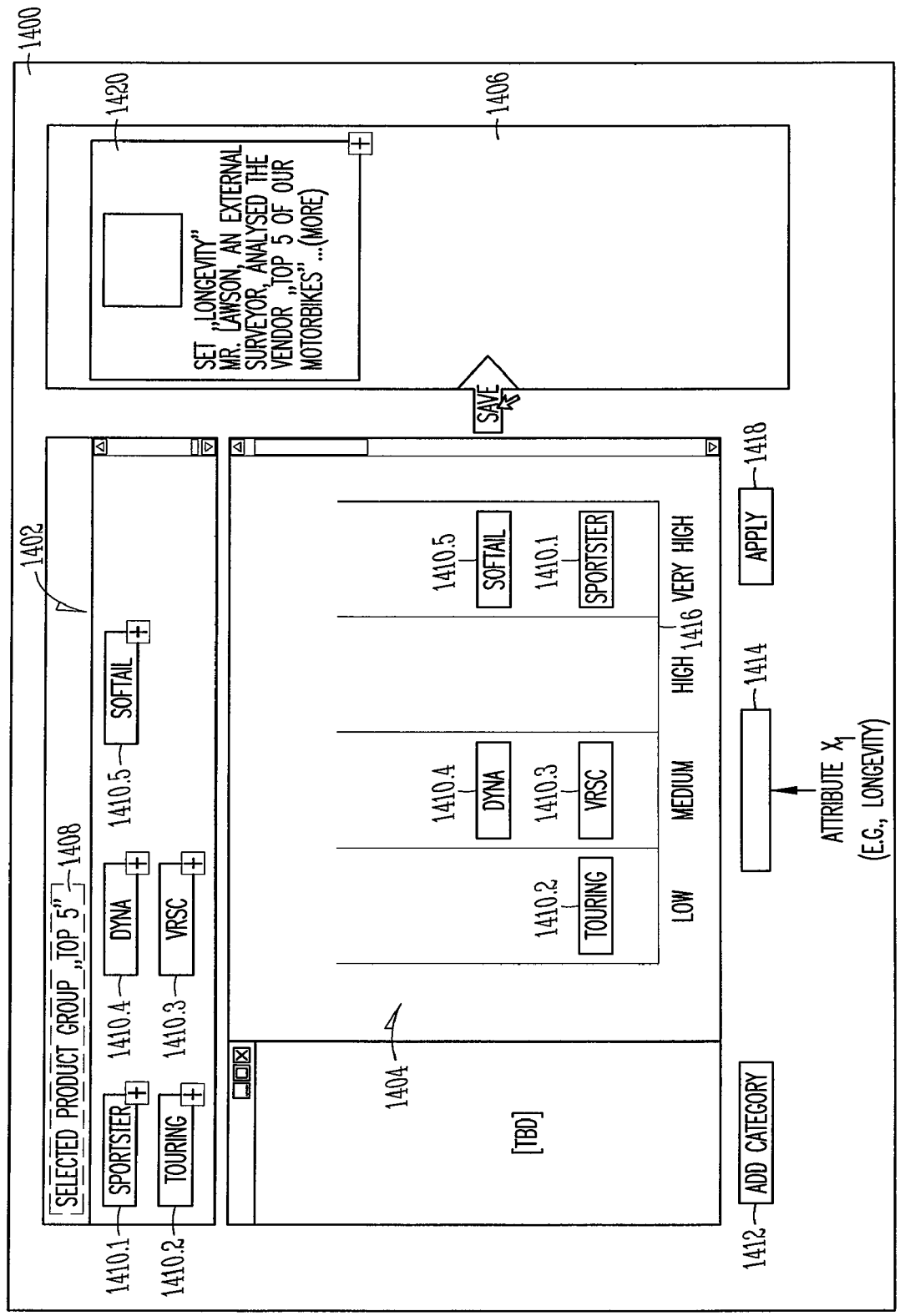
FIGS. 14 and 15 show schematic representations of further individual virtual surfaces, in accordance with example embodiments, that include a dashboard area identifying related virtual surfaces of different users and different attributes.
Figure 15:
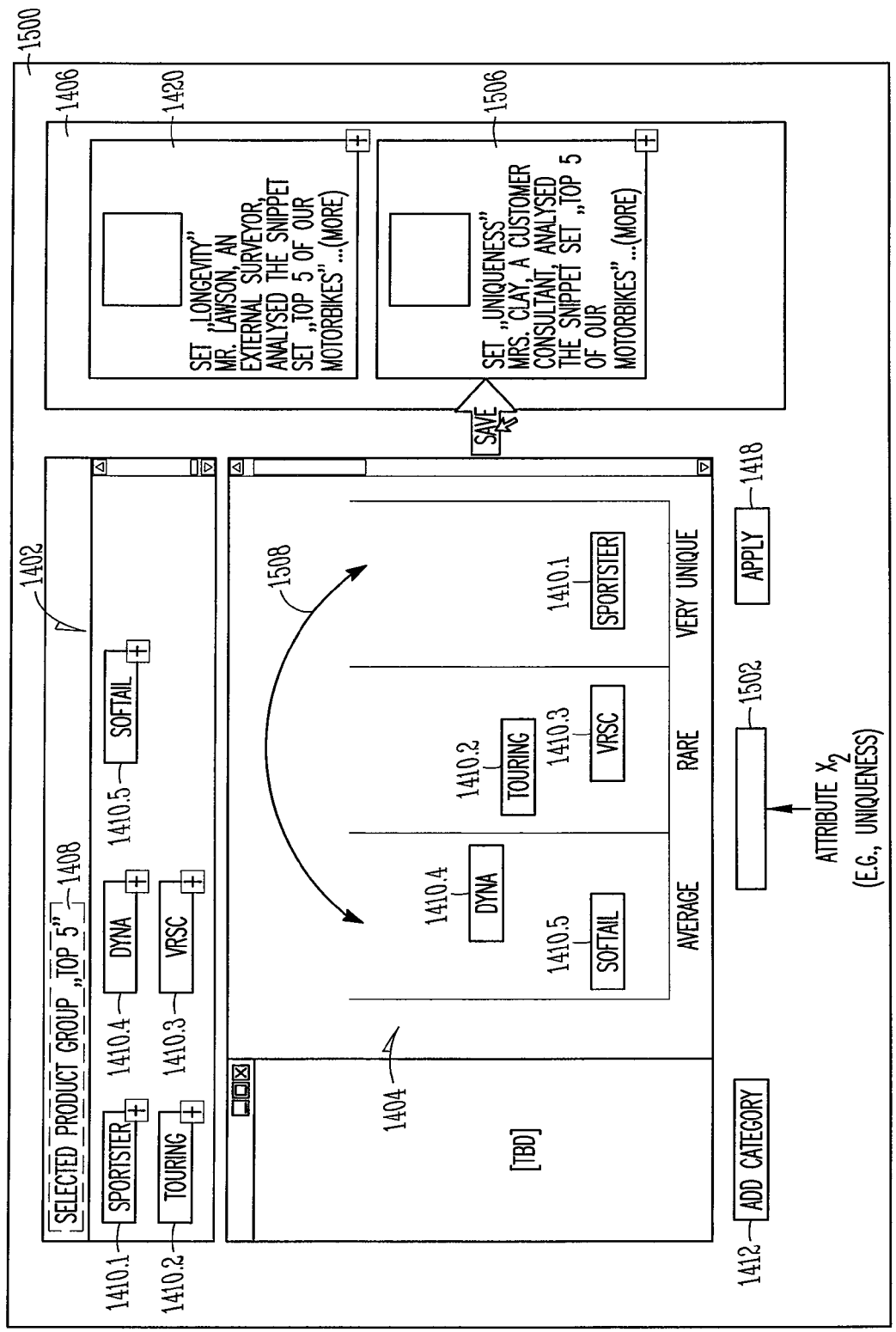

FIGS. 14 and 15 show schematic representations of further individual virtual surfaces, in accordance with example embodiments, that include a dashboard area identifying related virtual surfaces of different users and different virtual object attributes.

In FIG. 14 a GUI 1400 is shown to include an inactive virtual surface 1402, an active virtual surface 1404, and a dashboard area of 1406. The inactive virtual surface 1402 includes a selection arrangement 1408 that allows a user to select a product group represented by a plurality of virtual objects 1410.1-1410.5 for positioning on the active virtual surface 1404. The active virtual surface 1404 may include an ADD CATEGORY tab 1412 to allow a user to add one or more categories for display on the virtual surface 1404 and to store the category in the database 102. Further, the virtual surface 1404 has an associated attribute label 1414 (e.g., longevity) based upon which a user may position the virtual objects relative to a horizontal axis 1416. When a user has completed positioning of the virtual objects 1410.1-1410.5 on the active virtual surface 1404, the user may activate the "APPLY" button 1418. Upon activation of the APPLY button 1418, the virtual object association data in a database (e.g., the database 102) may then be updated to reflect the association between each virtual object and the attribute 1414. The dashboard 1406 may then be updated with an icon 1420 to identify the association data derived from the virtual surface 1404 has been saved.

In FIG. 15, a GUI 1500, substantially similar to the GUI 1400, is shown to include substantially similar virtual surfaces as those shown in the GUI 1400. A different attribute 1502 (e.g., uniqueness) is however shown for evaluating the products represented by the virtual objects 1410.1-1410.5. When the user has positioned the virtual objects 14.1-14.5 on the virtual surface 1404 based on the attribute 1502, he or she may then activate the APPLY button 1418 to store the virtual object association data in the database 102. Further, an icon 1506 is then added to the dashboard 1406. Thus, in the example GUI 1500, the dashboard 1406 may display a plurality of icons identifying associations that have been stored in the database 102. The example uniqueness attribute is not intended to be binary but to have its modern meaning where modifiers are used (e.g., very unique, etc.).

In an example embodiment, functionality may be provided (e.g., by the apparatus 200) that allows a user to move and reposition sub-attributes and their associated virtual objects into different virtual object display zones. For example, the user may move or rearrange sub-attributes and their associated virtual objects as shown by arrow 1508 in FIG. 15. In particular, arrow 1508 shows that the sub-attribute "VERY UNIQUE" and its associated virtual object 1410.1 may be swapped or exchanged with the sub-attribute "AVERAGE" and its associated virtual objects 1410.4 and 1410.5. It will be appreciated that the functionality may be facilitated in many different ways using a pointing device (e.g., a computer mouse, touch pad, or the like). Further, it will be appreciated that the sub-attribute "VERY UNIQUE" and its associated virtual object 1410.1 may not be swapped or exchanged with the sub-attribute "AVERAGE" and its associated virtual objects 1410.4 and 1410.5, but moved so that the sequence of sub-attributes and associated virtual objects is changed to "VERY UNIQUE" (and its associated virtual object 1410.1), "AVERAGE" (and its associated virtual objects 141.0.4 and 1410.5), followed by "RARE" (and its associated virtual objects 1410.2 and 1410.3). Thus, any sub-attributes and associated virtual objects may be arranged or positioned in a different sequence or order.

Figure 16:
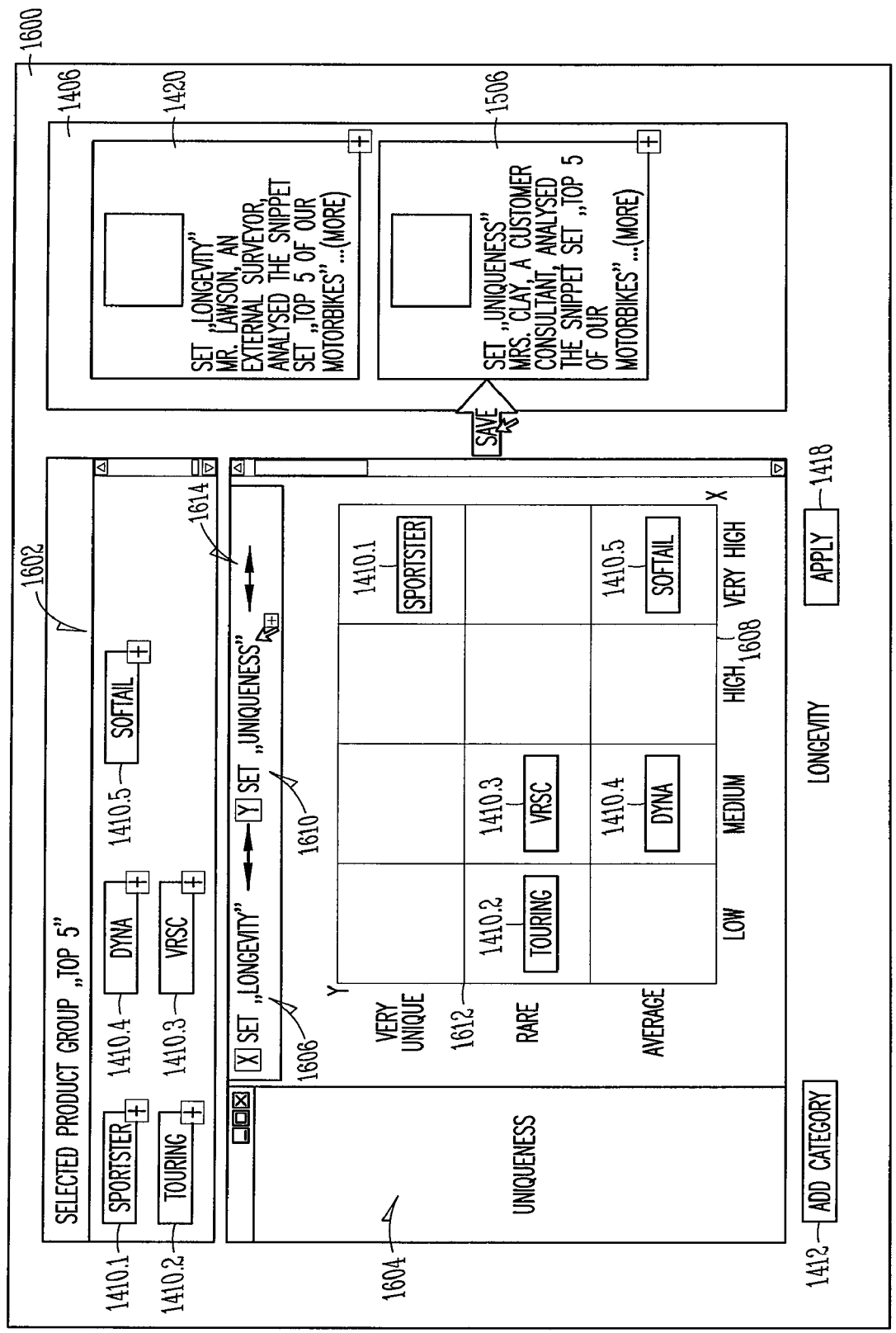
FIG. 16 shows a schematic representation of a graphical user interface, in accordance with an example embodiment, for allowing a user view positioning of virtual objects based on two or more associated attributes.

FIG. 16 shows a schematic representation of a joint virtual surface 1600, in accordance with an example embodiment, that allows a user to view the evaluation of virtual objects based on two or more attributes.

In FIG. 16, a GUI 1600 is shown to include an inactive virtual surface 1602, which may be substantially similar to the inactive virtual surface 1402, and an active virtual surface 1604. The GUI 1600 allows a user to view the positioning (and thus user evaluation) of the virtual objects 1410.1-1410.5 based on two or more virtual object attributes. In the example embodiment, a dropdown menu 1606 is provided to allow a user to select the virtual object attribute of the x-axis 1608, a dropdown menu 1610 to select the virtual object attribute for the y-axis 1612, and a dropdown menu 1614 to select further virtual object attributes. For example, the dropdown menu 1614 may select a further virtual object attribute that is identified in the active virtual surface 1614 by a color or other identifier.

As in the case of the virtual surface 1404, a user may activate an APPLY button 1418 to save virtual object association data produced by the positioning of the virtual objects on the joint virtual surface 1604. A further icon may then be displayed in the dashboard 1406.

Figure 17:
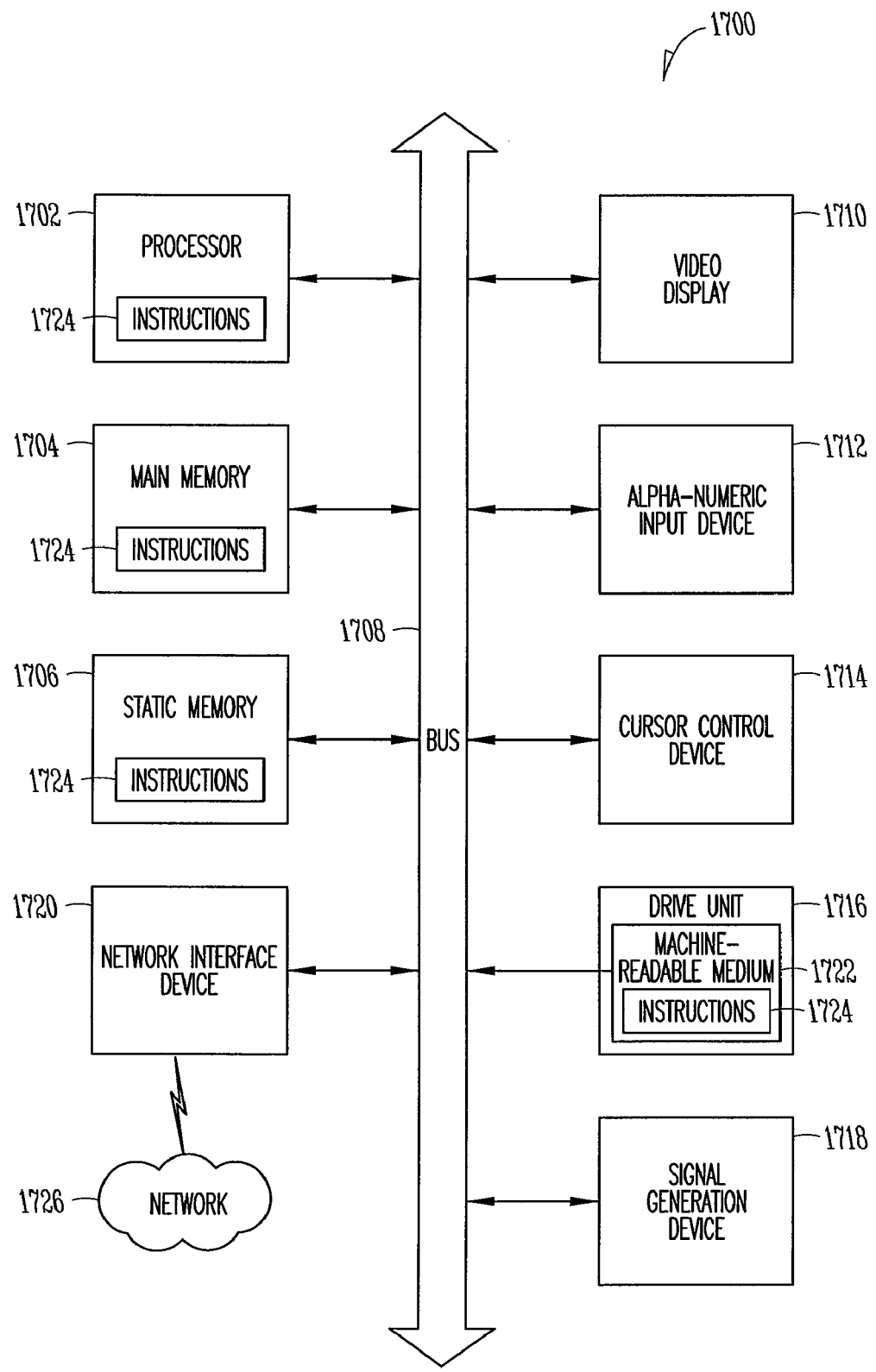
FIG. 17 is a block diagram of a computer processing system within which a set of instructions, for causing the computer to perform any one or more of the methodologies discussed herein, may be executed.

FIG. 17 is a block diagram of a computer processing system within which a set of instructions, for causing the computer to perform any one or more of the methodologies discussed herein, may be executed. In some embodiments, the computer operates as a standalone device or may be connected (e.g., networked) to other computers. In a networked deployment, the computer may operate in the capacity of a server or a client computer in server-client network environment, or as a peer computer in a peer-to-peer (or distributed) network environment. In a networked deployment, the computer may operate in the capacity of a server or a client computer in a server-client network environment, or as a peer computer in a peer-to-peer (or distributed) network environment.

Embodiments may also, for example, be deployed by Software-as-a-Service (SaaS), Application Service Provider (ASP), or utility computing providers, in addition to being sold or licensed via traditional channels. The computer may be a server computer, a personal computer (PC), a tablet PC, a set-top box (STB), a Personal Digital Assistant (PDA), cellular telephone, or any processing device capable of executing a set of instructions (sequential or otherwise) that specify actions to be taken by that device. Further, while only a single computer is illustrated, the term "computer" shall also be taken to include any collection of computers that individually or jointly execute a set (or multiple sets) of instructions to perform any one or more of the methodologies discussed herein.

The example computer processing system 1700 includes processor 1702 (e.g., a central processing unit (CPU), a graphics processing unit (GPU) or both), main memory 1704 and static memory 1706, which communicate with each other via bus 1708. The processing system 1700 may further include video display unit 1710 (e.g., a plasma display, a liquid crystal display (LCD) or a cathode ray tube (CRT)). The processing system 1700 also includes alphanumeric input device 1712 (e.g., a keyboard), a user interface (UI) navigation device 1714 (e.g., a mouse, touch screen, or the like), a disk drive unit 1716, a signal generation device 1718 (e.g., a speaker), and a network interface device 1720.

The disk drive unit 1716 includes computer-readable medium 1722 on which is stored one or more sets of instructions and data structures (e.g., software 1724) embodying or utilized by any one or more of the methodologies or functions described herein. The software 1724 may also reside, completely or at least partially, within the main memory 1704 and/or within the processor 1702 during execution thereof by the processing system 1700, the main memory 1704 and the processor 1702 also constituting computer-readable, tangible media.

The software 1724 may further be transmitted or received over network 1726 via a network interface device 1720 utilizing any one of a number of well-known transfer protocols (e.g., HTTP).

While the computer-readable medium 1722 is shown in an example embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding or carrying a set of instructions for execution by the computer and that cause the computer to perform any one or more of the methodologies of the present application, or that is capable of storing, encoding or carrying data structures utilized by or associated with such a set of instructions. The term "computer-readable medium" shall accordingly be taken to include, but not be limited to, solid-state memories, and optical and magnetic media.

While the invention(s) is (are) described with reference to various implementations and exploitations, it will be understood that these embodiments are illustrative and that the scope of the invention(s) is not limited to them. In general, techniques for maintaining consistency between data structures may be implemented with facilities consistent with any hardware system or hardware systems defined herein. Many variations, modifications, additions, and improvements are possible.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the invention(s).

What is claimed is:

1. A computerized method of providing an interactive virtual surface to display virtual objects, the method comprising:
    providing the virtual surface via a graphical user interface on a display screen, the virtual surface displaying an axis and a plurality of virtual objects;
    monitoring a positioning of each of the plurality of virtual objects by a user on the virtual surface relative to the axis; and
    persistently storing in a database virtual object association data identifying an association between each of the virtual objects and at least one attribute of the associated virtual object based on the positioning, the association comprising an evaluation by the user of the attribute.

2. The method of claim 1, further comprising:
    updating a storage arrangement in a database with the virtual object association data, the storage arrangement configured to store the virtual objects and corresponding virtual object association data.

3. The method of claim 1, further comprising:
    receiving a semantic input from the user;
    persistently storing the semantic input as the at least one attribute; and
    displaying the at least one attribute on the display screen adjacent to the axis.

4. The method of claim 1, further comprising accessing a database storing a plurality of attributes, the plurality of attributes being for display on the virtual surface.

5. The method of claim 1, further comprising:
receiving from the user an object creation input defining a virtual object; and
persistently storing the virtual object for display on the graphical user interface.

6. The method of claim 5, wherein persistently storing the virtual object comprises:
creating a data storage arrangement including a plurality of item entries, each item entry to receive a virtual object defined by a user and the data storage arrangement including at least one attribute data field to store corresponding association data.

7. The method of claim 1, further comprising:
accessing a database storing a plurality of virtual objects; and
displaying one or more of the virtual objects on the virtual surface.

8. The method of claim 1, wherein the user is one of a plurality of users and the association data is user specific, the method further comprising:
accessing first association data associated with a first user;
accessing second association data associated with a second user; and
simultaneously displaying virtual objects on the virtual surface at positions based on the first association data and the second association data.

9. The method of claim 1, wherein the virtual object association data is stored in addition to coordinate location data used by a rendering engine to graphically render graphical objects corresponding to the virtual objects.

10. The method of claim 1, wherein persistently storing the virtual object association data comprises:
generating a table including a plurality of item entries, each item entry corresponding to a virtual object and the table including a corresponding attribute data field for the virtual object association data; and
updating the virtual object association data in response to repositioning of an associated virtual object on the virtual surface.

11. The method of claim 1, wherein the axis is a horizontal axis corresponding to a first attribute and the virtual surface further comprises a vertical axis corresponding to a second attribute, the method further comprising:
monitoring the positioning of each virtual object relative to the horizontal axis to identify first association data; and
monitoring the positioning of each virtual object relative to the vertical axis to identify second association data, the first association data and the second association data being persistently stored in a manner so that the first and second association data is accessible independently.

12. The method of claim 11, further comprising:
generating a table including a plurality of item entries, each item entry corresponding to a virtual object and the table including a first attribute data field for storing the first association data and a second attribute data field for storing the second association data; and
updating the first attribute data field and the second attribute data field in response to repositioning of an associated virtual object on the virtual surface.

13. The method of claim 1, wherein the at least one attribute comprises two or more sub-attributes, the method further comprising:
generating a plurality of discrete zones along the axis, each discrete zone corresponding to a sub-attribute;
monitoring positioning of a virtual object in a selected discrete zone of the axis; and
updating the virtual object association data to identify that the virtual object is in the selected discrete zone.

14. The method of claim 1, wherein the virtual surface is a first virtual surface, the method further comprising:
providing a second virtual surface via the graphical user interface on the display screen; rendering the plurality of virtual objects on the second virtual surface, the plurality of virtual objects being positioned independently of the axis; and
providing functionality to allow the user to move the virtual objects from the second virtual surface to the first virtual surface using a pointing device.

15. The method of claim 1, wherein the virtual object association data comprises:
first association data identifying an association between the at least one virtual object and a first attribute; and
second association data identifying an association between the at least one virtual object and a second attribute, the method further comprising:
receiving a user selection to view a virtual surface that simultaneously shows positioning of the at least one virtual object based on the first attribute and the second attribute;
accessing the virtual object association data for the at least one virtual object to obtain the first association data and the second association data; and
displaying the at least one virtual object on the virtual surface based on the first association data and the second association data.

16. The method of claim 15, wherein the first association data is associated with a first user and the second association data is associated with a second user.

17. An interactive apparatus to provide a virtual surface to display virtual objects, the apparatus comprising:
a graphical user interface module to provide the virtual surface on a display screen, the virtual surface displaying at least one axis and a plurality of virtual objects;
a monitoring module to monitor positioning of each of the plurality of virtual objects by a user on the virtual surface relative to the at least one axis; and
a storage module to persistently store virtual object association data identifying an association between each of the virtual objects and at least one attribute of the associated virtual object based on the positioning, the association comprising an evaluation by the user of the attribute.

18. The apparatus of claim 17, wherein the virtual object association data comprises:
first association data identifying an association between the at last one virtual object and a first attribute; and
second association data identifying an association between the at least one virtual object and a second attribute, wherein the graphical user interface is configured to receive a user selection to view a virtual surface that simultaneously shows positioning of the at least one virtual object based on the first attribute and the second attribute, the apparatus including a request processing module configured to:
access the virtual object association data for the at least one virtual object to obtain the first association data and the second association data; and
display the at least one virtual object on the virtual surface based on the first association data and the second association data.

19. Apparatus to provide an interactive virtual surface for displaying a virtual object, the apparatus comprising:
- a processor;
- memory to store instructions that, when executed by the processor cause the processor to:
  - provide a virtual surface via a graphical user interface on a display screen, the virtual surface displaying at least one axis and a plurality of virtual objects;
  - monitor positioning of each of the plurality of virtual objects by a user on the virtual surface relative to the at least one axis; and
  - persistently store virtual object association data identifying an association between each of the virtual objects and at least one attribute of the associated virtual object based on the positioning, the association comprising an evaluation by the user of the attribute.

20. A non-transitory computer-readable medium embodying instructions that, when executed by a processor perform operations comprising:
- providing a virtual surface via a graphical user interface on a display screen, the virtual surface displaying at least one axis and a plurality of virtual objects;
- monitoring positioning of each of the plurality of virtual objects by a user on the virtual surface relative to the at least one axis; and
- persistently storing virtual object association data identifying an association between each of the virtual objects and at least one attribute of the associated virtual object based on the positioning, the association comprising an evaluation by the user of the attribute.

* * * * *